US008621610B2

(12) United States Patent
Oberheide et al.

(10) Patent No.: US 8,621,610 B2
(45) Date of Patent: Dec. 31, 2013

(54) NETWORK SERVICE FOR THE DETECTION, ANALYSIS AND QUARANTINE OF MALICIOUS AND UNWANTED FILES

(75) Inventors: Jon Oberheide, Troy, MI (US); Evan Cooke, Cambridge, MA (US); Farnam Jahanian, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 1114 days.

(21) Appl. No.: 12/186,014

(22) Filed: Aug. 5, 2008

(65) Prior Publication Data

US 2009/0044024 A1  Feb. 12, 2009

Related U.S. Application Data

(60) Provisional application No. 60/963,663, filed on Aug. 6, 2007, provisional application No. 61/083,531, filed on Jul. 25, 2008.

(51) Int. Cl.
*G06F 21/00* (2013.01)

(52) U.S. Cl.
USPC ............... 726/22; 726/23; 726/24; 726/25; 713/189; 713/190; 713/191; 713/192; 713/193; 713/194

(58) Field of Classification Search
USPC ............... 726/22–25; 713/189–194
See application file for complete search history.

(56) References Cited

U.S. PATENT DOCUMENTS

| | | |
|---|---|---|
| 5,854,916 A | 12/1998 | Nachenberg |
| 6,094,731 A | 7/2000 | Waldin et al. |
| 6,851,057 B1 * | 2/2005 | Nachenberg ............... 726/24 |
| 7,010,807 B1 | 3/2006 | Yanovsky |
| 7,020,895 B2 | 3/2006 | Albrecht |
| 7,152,164 B1 | 12/2006 | Loukas |
| 7,188,369 B2 | 3/2007 | Ho et al. |
| 7,409,717 B1 * | 8/2008 | Szor ............................. 726/24 |
| 2003/0023866 A1 * | 1/2003 | Hinchliffe et al. ........... 713/200 |
| 2003/0208687 A1 | 11/2003 | Liang et al. |
| 2004/0158730 A1 | 8/2004 | Sarkar |
| 2007/0094539 A1 | 4/2007 | Nakatsuka et al. |
| 2007/0240217 A1 * | 10/2007 | Tuvell et al. ................ 726/24 |

FOREIGN PATENT DOCUMENTS

| | | |
|---|---|---|
| KR | 10-2005-0107651 | 11/2005 |
| KR | 10-2006-0032855 | 4/2006 |

* cited by examiner

*Primary Examiner* — Ghazal Shehni
(74) *Attorney, Agent, or Firm* — Harness, Dickey & Pierce, P.L.C.

(57) ABSTRACT

A system is provided for detecting, analyzing and quarantining unwanted files in a network environment. A host agent residing on a computing device in the network environment detects a new file introduced to the computing device and sends the new file to a network service for analysis. The network service is accessible to computing devices in the network environment. An architecture for the network service may include: a request dispatcher configured to receive a candidate file for inspection from a given computing device in the network environment and distribute the candidate file to one or more of a plurality of detection engines, where the detection engines operate in parallel to analyze the candidate file and output a report regarding the candidate file; and a result aggregator configured to receive reports from each of the detection engines regarding the candidate file and aggregates the reports in accordance with an aggregation algorithm.

22 Claims, 3 Drawing Sheets

NETWORK SERVICE FOR THE DETECTION, ANALYSIS AND QUARANTINE OF MALICIOUS AND UNWANTED FILES

CROSS-REFERENCE TO RELATED APPLICATIONS

This application claims the benefit of U.S. Provisional Application Nos. 60/963,663, filed on Aug. 6, 2007 and 61/083,531, filed on Jul. 25, 2008. The disclosure of the above applications is incorporated herein by reference.

GOVERNMENT RIGHTS

This invention was made with government support under NBCHC060090 awarded by Department of Homeland Security. The government has certain rights in the invention.

FIELD

The present disclosure relates to generally to a network service for detecting, analyzing and quarantining malicious and unwanted software and files.

BACKGROUND

The problem of detecting malicious and unwanted software has become increasingly challenging. Antivirus software installed on end hosts in an organization is the de-facto tool used to prevent malicious and unwanted software, files, and data (henceforth referred to as 'unwanted files') from being downloaded, opened, accessed, or executed. While a single antivirus engine may be able to detect many types of malware, 0-day threats and other obfuscated attacks can frequently evade a single engine. Instead of running complex analysis software on every end host, this disclosure contemplates that each end host run a lightweight agent to acquire files and data entering a system and send that information to an 'in-cloud' network service for analysis by multiple heterogeneous detection engines in parallel. Analysis results are used to automatically delete, quarantine, disable, or warned users and administrators about unwanted or malicious software and files on end hosts. The statements in this section merely provide background information related to the present disclosure and may not constitute prior art.

SUMMARY

A system is provided for detecting, analyzing and quarantining malicious and unwanted files in a network environment. A host agent residing on a computing device in the network environment detects a new file introduced to the computing device and sends the new file to a network service for analysis. The network service is accessible to computing devices in the network environment. An architecture for the network service may include: a request dispatcher configured to receive a candidate file for inspection from a given computing device in the network environment and distribute the candidate file to one or more of a plurality of detection engines, where the detection engines operate in parallel to analyze the candidate file and output a report regarding the candidate file; and a result aggregator configured to receive reports from each of the detection engines regarding the candidate file and aggregates the reports in accordance with an aggregation algorithm.

The system may also be configured to retrospectively detect malicious or unwanted files that have been accessed in the past. Upon analyzing a file, the network service logs an entry into a file history database. When a new signature or identification of a malicious or unwanted file or behavior becomes available from a network server or from another internal or external source, this information is passed along to a retrospective detector which in turn searches the file history data database for any previously analyzed files that match the unwanted file. If a match is found, the retrospective detector can notify system administrators and users, remove the unwanted file from an infected host device, quarantine the infected device or user, and/or take other corrective measures.

Further areas of applicability will become apparent from the description provided herein. It should be understood that the description and specific examples are intended for purposes of illustration only and are not intended to limit the scope of the present disclosure.

DRAWINGS

DETAILED DESCRIPTION

Figure 1:
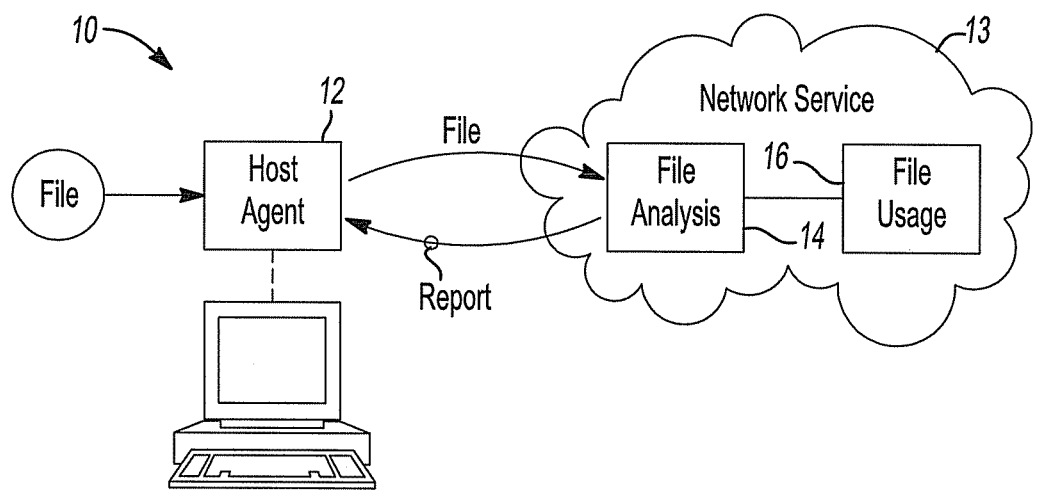
FIG. 1 is a diagram illustrating a system for detecting, analyzing and quarantining unwanted files in a network environment.

FIG. 1 illustrates a system 10 for detecting, analyzing and quarantining unwanted files in a network environment. The system is comprised of three major components: a host agent 12 and a network service 13 offering a file analysis component 14 and a file usage component 16. Each component may be embodied as computer executable instructions in a computer readable medium and residing on a computing device in the network environment.

Briefly, the host agent 12 is a host-based software component that acquires files and forwards them to the network service 13 for inspection. The host agent 12 may further include a mechanism to block access to a file while it is being analyzed. A host agent resides on a host in the network environment, where a host is defined as a desktop, workstation, server, laptop, PDA, phone, mobile device, or other computing device or system through which a malicious file might traverse.

The network service 13 is accessible to the hosts in the network environment. The file analysis component 14 of the network service 13 receives candidate files and analyzes them to identify unwanted files. The file analysis component 14 in turn generates and sends a report back to the host with instructions about whether to open, run, or quarantine the files. A 'file' is defined as a collection of letters, numbers, or special characters such as a document, executable, shared library (e.g., DLL), presentation file, project file, system file, registry/preference file, or other sequence of information stored on volatile or non-volatile storage medium. The network service also provides a file usage component 16 for automatically collecting, storing, and providing access to detailed information about the files accessed, opened, or executed across multiple computer systems in the network environment. Each of these components will be further described below.

Malicious or unwanted files can enter an organization using a range of different paths. For example, mobile storage devices (e.g., a USB stick), email attachments, downloads (wanted or unwanted), and vulnerable network services are common entry points. Due to the broad range of entry vectors, the architecture includes a file acquisition software system that is run on each end host.

Figure 3A:
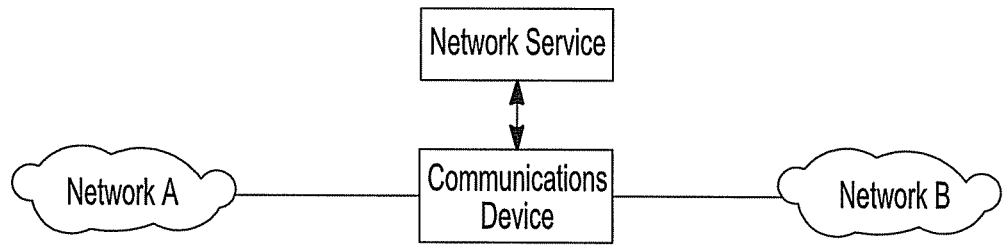
FIGS. 3A-3D are diagrams illustrating a subset of possible deployment topologies for a network service.

FIGS. 3A-3D illustrates a subset of possible deployment topologies for a network service and host agent. In FIG. 3A, Network A (which can be a wide area network or local area network) communicates with Network B (which can be a wide area network or local area network). A communications device, such as a router or switch, passes files or communications between Network A and Network B. The communications device is also running an instance of the host agent software and can send all or some subset of those files or communications and their associated metadata to the network service for evaluation.

Figure 3B:
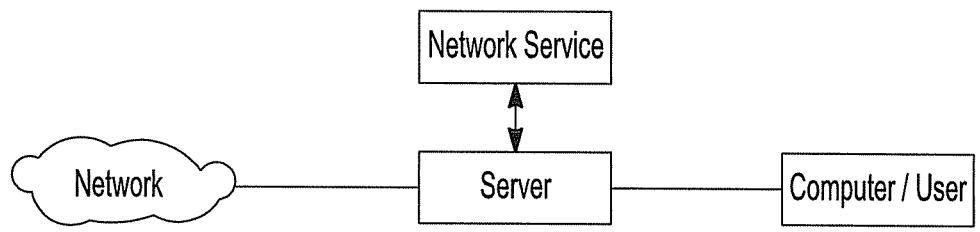

In FIG. 3B, network on the left side of the figure (which can be a wide area network or local area network) communicates with a computer system or user on the right of the figure. A server acts an intermediary for files or communications between the network and computer system or user. This server could be an email server, web proxy, firewall, NAT device, gateway, or any other type of intermediary through which files or communications pass between a computer system or user and the network. The server is also running an instance of the host agent and can send all or some subset of those files or communications and their associated context to the network service for reputation evaluation.

Figure 3C:
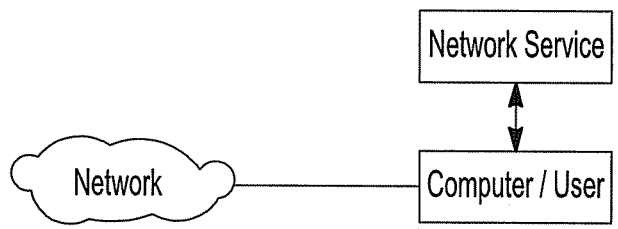

In FIG. 3C, a network (which can be a wide area network or local area network) communicates with a computer or user. The computer runs the host agent software or the user manually interacts with the network service. Either can send all or some subset of the files on the computer or communications sent or received from the network and their associated context to the network service for reputation evaluation.

Figure 3D:
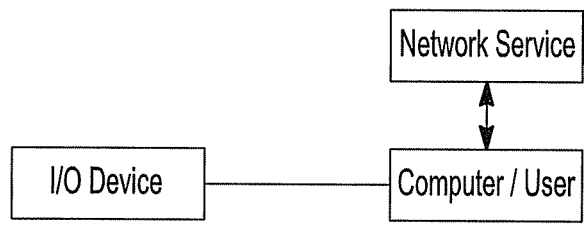

In FIG. 3D, an I/O Device such as a portable hard drive, USB stick, mobile device, or other non-network input device that can be connected to a computer system communicates with a computer or user. The computer runs the host agent software or the user manually interacts with the network service. Either can send all or some subset of the files on the I/O device or the computer and their associated context to the network service for reputation evaluation.

Each participating host system runs a piece of software called the host agent that inspects each file entering or accessed on a computer system. The host agent can be implemented as one or more programs, drivers, extensions, kernel modules, operating system patches, hypervisor changes, or other user/and or operating and control system modifications or virtual machine guest, host, or hypervisor modifications. When a user receives a new file (e.g., via file-copy, installation, or download), the host agent automatically detects the file and tracks metadata about the file. The file is then sent to the network service for analysis while the host agent blocks access to the file on the host. Finally, when the host agent receives a report from the network service the host agent either performs some action with the file, such as deleting it, or allows normal use of the file to proceed.

The host agent may use several processes to determine when a new or unanalyzed file has entered a system. The host agent may use a driver, extension, kernel module, operating system patch, or other operating, hypervisor, or control system modification or virtual machine guest, host, or hypervisor modifications to detect when a file is created or written to disk or memory. For example, modern operating systems include system calls for creating or writing files. The host agent can hook or otherwise trap invocations of those system calls to determine when new files are created or existing files are modified.

The host agent can also track the attachment of I/O devices to detect when new files are introduced to a system. For example, when a portable hard drive, flash drive, or network drive is mounted or detected, the host agent can trap the relevant operating system or hypervisor events and analyze the files on the device before they can be accessed by the operating system, other applications or users.

The host agent can also track network events to detect when data transmitted over the network could cause a local file to be written or modified. For example, when a user downloads a file, the network socket associated with the download process could be detected and instrumented to gather file data before it is actually written to disk.

In addition to identifying when a new or unanalyzed file has entered a system, the host agent also tracks metadata, including context data regarding the file. Metadata associated with files can be segmented into three classes: (1) filesystem metadata, (2) network-related metadata, and (3) host context metadata.

Filesystem metadata includes information detailing the medium on which the file under investigation resides or has been used to introduce the file into the system. For example, this metadata includes attributes such as the type of medium (hard disk, CDROM, USB drive, floppy disk, etc), the filesystem employed on the medium, the file's path, the file's name, the file's size, permission or access control lists related to the file, timestamps (created, last modified, last accessed) of the file, and any potential historical data associated with the file. Historical data may consist of previous accesses or modifications to the file, the user which performed them, and when they were performed and may be tracked and archived over time by the host agent.

To acquire filesystem metadata, the host agent can make calls to the VFS layer provided by the operating system. The VFS layer is a software abstraction that provides a standard interface to filesystem information such as file sizes, permissions, and other attributes that constitute the filesystem metadata regardless of the underlying medium (hard drive, CDROM, USB drive, etc). In order to track more detailed metadata such as historical file data, the host agent can implement hooks within the VFS layer or other file abstraction layer to record accesses and modifications to the filesystem.

Network metadata includes the network protocol used, the source and destination of the communication, and other network communications details such as header fields and payloads. The acquisition of network-related metadata can be performed by monitoring network events at a variety of layers. The host agent may instruct each application to gain insight into socket operations performed by that application. In addition, the host agent may leverage mechanisms provided by the operating system to monitor network activity. Lastly, the host agent may instrument the driver and/or firmware of the network interface card (NIC) to achieve raw access to the communications passing through the NIC. When the host agent is able to monitor the network communications, it can use deep packet inspection (DPI) techniques to parse out pertinent header fields and protocol payloads. This may occur on the end system running the host agent software or on a device deployed in the network.

Host context metadata consists of information that is gathered from the host's environment or operating system. The current user, the host's name or identification, the hardware configuration associated with the host, the processes that exist on the host, versions of the operating system or associated applications and libraries, and the current date/time are all examples of metadata that describe the host context. Host context can also be entire state of a host including, the state and memory of all running applications and operating systems and connected IO devices. A virtual machine image such as those produced by products like Xen and VMWare Workstation constitute host context metadata.

Several methods can be used to acquire host context metadata. First, standard userland and operating system calls can be made. Enumerating the available hardware configuration or current set of processes may require kernel or operating system instrumentation. Determining versions of the operating system, applications, and libraries may require that the agent actively query the operating system or keep a history of software updates. The second method of acquiring host context is using virtual machine technology. The host agent can take a snapshot of the guest and transmit that snapshot, a summary of that snapshot, or part of that snapshot to the network service. The snapshot can also be 'live migrated' to the network service. In such a situation two approaches are used. First, when the guest image is migrated into the network service execution ceases on the system with the host agent while analysis in progress. Such an approach provides maximum security for the host. Another approach is fork execution of the virtual machine. With this technique execution of the virtual machine continues on the end host and within the network service simultaneously. In all these cases the virtual machine images provides host context to aid the evaluation of files.

Files identified by the host agent are sent, along with any metadata, to the network service for analysis. For example, the host agent on a user's machine might detect when a user downloads a new Win32 executable and the host agent might send the executable, information about the application used to download the executable, and the network protocol used to download the executable to the network service for analysis.

During analysis by the network service, the host agent can operate in several different interactivity modes. Each host agent can be configured to use only one of these modes or some combination of the modes depending on the file, user, or other context. In a transparent mode, the detection software is completely transparent to the end user. Files are sent to the network service for analysis but the execution or loading of a file is never blocked or interrupted. In this mode end hosts can become infected by malware or run or access unwanted files because access to those files is not blocked. In this mode end hosts can become infected by malware or run or access unwanted files because access to those files is not blocked. However, the report produced by the network service can be used to identify these occurrences and mitigate an damage as describe later.

In a warning mode, access to a file is blocked until an access directive has been returned to the host agent. If the file is classified as unsafe, then a warning is presented to the user instructing them why the file is suspicious. The user is then allowed to make the decision of whether to proceed in accessing the file or not.

In a blocking mode, access to a file is blocked until an access directive has been returned to the host agent. If the file is classified as suspicious, then access to the file is denied and the user is informed with an error dialog. In either case, blocking access to a file while it is being analyzed is a critical component of the architecture. Without such blocking, an unwanted file could be accessed causing irreparable damage to a system or causing a host to become infected with malware, spyware, or other unwanted software. The blocking of access to files by a host agent is achieved by detecting when the operating system, hypervisor, process, or user attempts to open or read any part of a file or executable. This detection process can be implemented through the use of a driver, extension, kernel module, operating system patch, or other operating, hypervisor, or control system modification to detect read of a file.

Another of the core components of the host agent is a unique file identifier (UID) generator. The goal of the UID generator is to provide a compact summary of a file. That summary is transmitted over the network to determine if an identical file has already been analyzed by the network service. A file summary is an efficient representation or description of a file such as a subset of the bytes in the file (e.g., first N bytes) or a permutation of those bytes such as a hash. One of the simplest methods of generating such a UID is a cryptographic hash of a file, such as MD5 or SHA-1. Cryptographic hashes are fast and provide excellent resistance to collision attacks. However, the same collision resistance also means that changing a single byte in a file results in completely different UID. To combat polymorphic threats, a more complex UID generator algorithm could be employed. For example, a method such as locality-preserving hashing in multidimensional spaces could be used to track differences between two files in a compact manner. Other techniques for representing a file are contemplated by this disclosure.

UIDs may be used to improve system performance. For example, the network service can check a cache for the UID of previously analyzed files to see if a given file has already been analyzed. If so, the network service can immediately send the cached response to the client. Similarly, the host agent can keep a local cache of recently analyzed files that can be checked before sending a new file to the network service. In this way, a client can avoid generating a network service request if the hash is already in the local cache.

The architecture may include two optimizations aimed at reducing the latency perceived by end users when accessing newly obtained files. The first is file write detection by the host agent. When the host agent detects that part or all of a new file has been written to disk or memory it can immediately begin sending the file to the network service for analysis without waiting for the entire operation to complete. When a user or application does eventually attempt to access the file the report for the file has already been produced and cached so no network request is needed. A second optimization technique to reduce file access latency is a network stream sensor that promiscuously monitors a network tap (e.g., the span port on a switch) to acquire executables and other suspicious files. By deploying such a component, files can be extracted out of network transmissions on the fly and analyzed by the network service before even reaching the destination end host.

Figure 2:
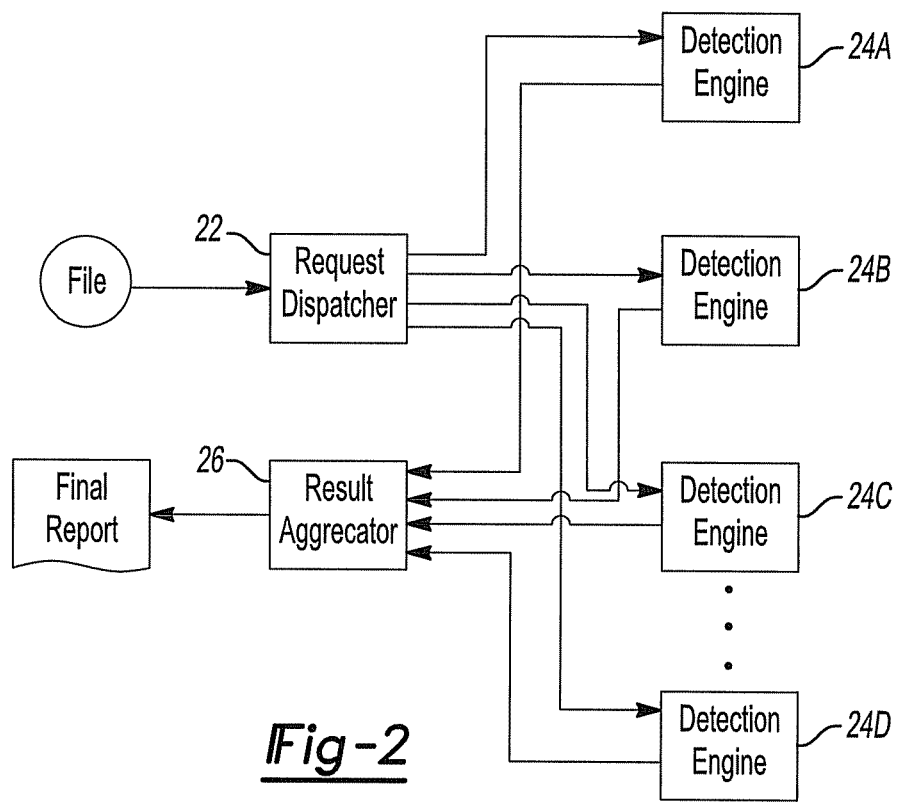
FIG. 2 is a diagram illustrating an exemplary architecture for a file analysis component of the network service.

FIG. 2 illustrates an exemplary architecture for the file analysis component 14 of the network service. In this exemplary embodiment, an array of parallel detection engines are employed by the file analysis component. This approach provides several key benefits including significantly better detection coverage of malicious files compared to any single detection engine, increased performance compared to the serial execution of multiple detection engines, and scalability because the system is implemented as a network service and computational resources can be added as needed. Moreover, this approach has application outside the detection of unwanted files. Parallel detectors can be applied to many different detection domains such as the identification of malware, spam, phishing, spyware, botnets, worms, peer-to-peer files/applications, copyrighted materials, or any other process that involves a detection system that can be automated and implemented in a network service.

In the exemplary embodiment, a request dispatcher 22 receives candidate files and communications and distributes them to an array of detection engines 24A-24n. The request dispatcher 22 can distribute a file or communication to all detection engines or a subset of the detectors. The request dispatcher 22 can use the type of file or communication to help determine which set of detectors to use. This process can be done in such a manner as to balance the load across multiple instances of each detection engine. If one instance of a given detection engine is busy, then the request dispatcher can allocate an analysis job to another instance. For example, if there is a set of two detectors A and B and two instances of each detector A1, A2 and B1, B2, then a request can be forwarded any one or two of the detector instances. If B1 is busy servicing another request then that request could be forwarded to A1 and B2 for analysis. The request dispatcher 22 can also choose not to send a request to certain detectors. For example, the dispatcher might only send an analysis task to an instance of detector A without sending it to instance of detector B. In order to determine which detectors are busy the request dispatcher includes a component to either probe the detector or receive status information include the load on the detector.

An array of one or more detection engines 24A-24n is used to analyze the same file or communication in parallel. Each detector is an automated process that takes a file or communication and the metadata and context associated with that file as input and attempts to determine if the file or communication is malicious or unwanted. This process can involve local signatures or heuristics stored in the detector or can involve interaction with other remote systems through the network. For example, a detector might use a remote database located across the Internet to determine if the source address of a communication was on a known blacklist. Once a detector has either decided a file or communication is malicious or unwanted or cannot make a determination, it produces a report that is readable in an automated manner by the result aggregator. For example, a detector based on an antivirus engine could analyze a file then return a report indicating whether the file was malicious and set of variant labels if the file was malicious.

Each detection engine can be instantiated one or more times on one or more servers in order to process multiple files or communication simultaneously. Each instance of a detection engine can be isolated from other detection engines or other instances of the same detector in order provide additional security. For example, one might deploy each detector inside a virtual machine that can be cloned and deployed on additional servers in order to service multiple analysis requests simultaneously. The isolation of the detection engines also helps prevent a malicious file or communication from infecting the network service and compromising the analysis system itself.

The parallel arrangement also provides an optional facility for detection engines to communicate with each other in order to share detection results. The communication facility enables one detection engine to proactively provide a result to another detector or request a result from another detector. Such sharing allows one detector to provide analysis hints to another detector reducing analysis times and increasing detection capabilities. For example, a behavioral detection system could be used to analyze a set of known malicious files already labeled as malicious by an antivirus-based detection system. When a new file that could not be labeled by an antivirus detector was found, and the behavioral fingerprint of that file matched one of the previously analyzed and known malicious files, then the new file could be marked as potentially malicious. Another example is a detector that takes network communications and looks for suspicious Internet Relay Chat (IRC) behavior. When suspicious behavior was found using that detector, another detector could further analyze the servers and clients involved in the communication by probing them to determine if the communication was potentially malicious or unwanted.

The specific backend analysis techniques used by a detection engine are independent of the proposed architecture. The basic requirement is that each detection engine produce a report of a file that can be used to aid in the determination of a file as malicious or unwanted. In the exemplary embodiment, the detectors take two sets of input (1) the candidate file, and (2) the file, network, and/or host context associated with that file. The context can be used in two ways (1) to aid in the analysis of the file and (2) aid in the interpretation of the reports received from the detectors.

File, network, and host context information can be used to aid in the detection of unwanted file. Context can be used to determine which detection algorithm to apply, or how to apply those algorithms. For example, file context information can be used to identify system files and then apply a detection algorithm that looks for unwanted system modifications. Network context can be used to associate protocol anomalies with files such as buffer overflow attempts and classify such files as suspicious. Host context such as virtual machine images and data can be used replicate the state of the end host and simulate the access, opening, or running of a file safely inside an isolated environment. And changes to the memory or disk state of that virtual machine can noted, and the results used to aid in the finally determination of whether the file was malicious or unwanted.

Two general classes of detector seem particularly well suited to the proposed approach. Antivirus detection engines are commercially available today and can differ significantly in their detection coverage. By analyzing each candidate file with multiple antivirus engines, the network service is able to provide better detection of malicious software. Behavioral analyzers or detection engines comprise a second class of detectors. A behavioral system can execute a suspicious file in a sandboxed environment (e.g., Norman Sandbox, CWSandbox) or virtual machine and record host state changes and network activity. A behavioral analysis might take the state of a host in the form of virtual machine image as input. Other types of detectors are also contemplated within the scope of this disclosure.

While performing analysis in parallel is far more efficient than serial execution, delay can still exist between when an executable is submitted and when the result is returned. The architecture employs a caching mechanism to better deal with associated latencies. Once a threat report has been generated for a candidate file, it can be stored in both a local cache on the host agent and in a shared remote cache on the server. This means that once a file has been analyzed, subsequent accesses to that file by the user can be determined locally without requiring network access. Moreover, once a single host in a network has accessed a file and sent it to the network service for analysis, any subsequent access of the same file by other hosts in the network can leverage the existing threat report in the shared remote cache on the server. Cached reports stored in the network service may also periodically be pushed to the host agent to speed up future accesses and invalidated when deemed necessary.

The result aggregator 26 collects responses from the different detection engines, applies an aggregation algorithm, and sends a report back to the requester. The synthesis process aggregates the different variant labels and virulence information from the detection engines to construct a report on a file or communication. This can be done in a number of different ways. This most basic approach is to simply mark a file or communication as malicious or unwanted if any single detector identifies it as malicious or unwanted.

The second major use of context information such as file metadata is to interpret and formulate the aggregation result. For example, if a file is flagged as unknown by the different detection engines but was received by email from someone in the same organization, then it might be marked as clean. However, if an executable was flagged as unknown by all the detection engines but was downloaded using a peer-to-peer client using a peer-to-peer network protocol then it might be marked as potentially malicious and warrant further inspection by an administrator.

A more complex approach is to compute a reputation for each file or communication. The reputation assigned by the result aggregator 26 can include several components. The first is a score that indicates how malicious or unwanted a file or communication is. The score might be a floating-point number or integer. The second component is a report that includes information about how and why the score was assigned. The third component is a set of instructions on how to process or handle the file or communication. When a detector returns a result that result can be aggregated into the reputation in several ways: (1) it can modify the reputation score, (2) it can contribute information to the report about how and why the score was modified, or (3) it can modify the instructions on how to process or handle the file or communication.

The assignment of reputation for a file is determined by the collection of contextual metadata. The evaluation of each element in this collection can affect the overall reputation of the file or communication in a negative, positive, or neutral manner.

A negative evaluation will decrease the reputation assessment of an object. Examples that may result in a negative evaluation include but are not limited to:
  Blacklist: the object or a representation of it exists in a list that explicitly denies access
  AV Detection: the object is deemed malicious by one or more antivirus detection engines
  Behavioral Analysis: the run-time behavior of an object is deemed malicious by a behavioral analysis engine
  Shellcode Presence: the presence of executable code (either normal or obfuscated) in an object may indicate malicious intent
  Intrusion Detection Systems: byte sequences of the object match signatures of known malicious content
  Network Protocol: the protocol used by a file or communication may indicate unwanted or malicious intent (P2P protocols, email attachments, etc)
  Activity Pattern: the pattern of activity associated with object across a network or host may indicate worm-like spreading or other suspicious and unwanted behavior.
  Untrusted Source: the source of the object is unknown or untrusted
  Bad Source: the source of the object is known to be unscrupulous by explicit specification, external sources such as real-time blackhole lists, or other method
  Untrustworthy Client: the client itself may have exhibited suspicious and/or malicious behavior and is thereby denied access to the given object A positive evaluation will increase the reputation assessment of an object. Examples that may result in a positive evaluation include but are not limited to:
  Whitelist: the object or a representation of it exists in a list that explicitly allows access
  AV Detection: the object is not deemed malicious by one or more antivirus detection engines
  Trusted Source: the source of the object is a trusted entity, determined by cryptographic signatures, explicit specification, or other method
  Absence of Negative Indicators: an object lacking indications of unwanted or malicious activity may indeed have a positive effect on the reputation of the object A neutral evaluation has no effect on the reputation of the object under investigation but may provide useful information to the client. Examples that may result in a neutral evaluation include but are not limited to:
  PE/ELF header information: information contained in the header of executables
  File attributes: file-specific attributes such as size, path, type, etc
  Packet attributes: fields contained in a network packet (IP time-to-live, TCP port, etc)
  Temporal attributes: values such as creation, modification, access timestamps The resulting evaluation: (1) will modify the object's reputation score, (2) may contribute information to the report about how and why the score was modified, and (3) may modify the instructions on how to process or handle the object. For example, metadata such as the source of a file may result in a positive evaluation and increase the reputation of the file if the source is determined to be trusted by the network service. On the other hand, a communication using a network protocol deemed unsafe by the network service (such as peer-to-peer protocol) may result in a negative evaluation that decreases the reputation of the communication.

The aggregation process can be done once after all the results are returned or dynamically as each result is returned. For example, if detectors A, B, and C are used to evaluate a file in parallel and detector C takes a long time to run, then results from A and B could be aggregated into a report and sent to the client before the result from C was returned. Such an approach clearly has security implications if C discovers the file is malicious. However, such a technique may be useful if performance is more important than perfect detection.

The report that is sent back to the client can include a variety of information such as a set of instructions on how the file or communication should be processed, deleted, or quarantined, a list of host and network behaviors observed by the detectors, or informational resources such as a list of malware family/variant labels assigned by the different detection engines. In addition, the report can include a reputation label indicating the overall relative safety of the file or communication and its relation to other host, applications, or users in the network.

The final report can include a range of different instructions and forensics information for the client. Three exemplary sections are:
  1. Operation Directive: a set of instruction indicating the action to be perform by the host agent such as how the file should be accessed, opened, run, or quarantined.
  2. Family/Variant Labels: a list of malware family/variant labels assigned to the file by the different detection engines.
  3. Behavioral Analysis: a list of host and network behaviors observed during simulation. This may include information about processes spawned, files and registry keys modified, network activity, and other state changes.

When analysis of a file is complete, the file analysis component 14 then sends the corresponding threat report back to the client that submitted the file. Analysis of each file is an asynchronous process.

As soon as the host agent has submitted a file to the network service, it may block the host operating system and user applications from opening, running, or otherwise accessing the file until a report from the service about the file has been received. For example, if a user downloads an executable from the Web and double clicks it before a report on that executable has been returned by the network service, then the host agent will block running of the executable until a report has been received. When the host agent receives the threat report, it can look at the operation directive and then either allow the user to the open the file, run the executable, or quarantine the file and present the report to the user with information about the quarantined file. The host agent and network service store detailed logs about this process that can be analyzed later by operators or automated programs.

Figure 4:
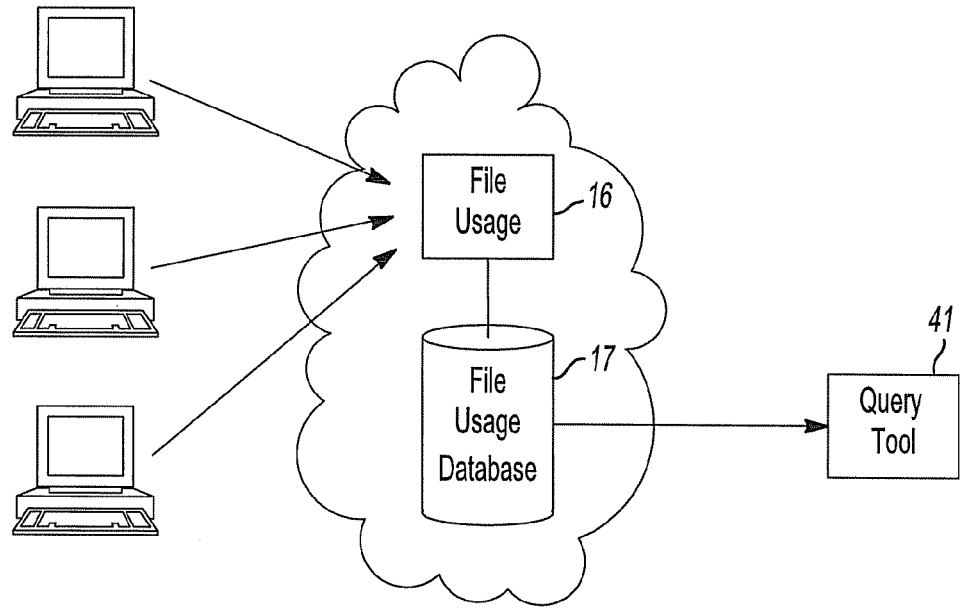
FIG. 4 is a diagram illustrating a file usage component of the network service.

FIG. 4 illustrates the file usage component 16 of the architecture. The file usage component 16 automatically collects, stores, and provides access to detailed information about the files accessed, opened, or executed across multiple computer systems. Various host agents 12 collect detailed information about what files are accessed, opened, or executed and sends it to a network service, where the file usage component 16 stores that information in a file usage database 17. The file usage component also includes a query platform 41 that provides fast access to detailed information about the files used on participating computer systems. The information collected and made available can be used for a wide range of management and security tasks such as to track the applications run by different users, track the files accessed by different users or computers, track the misuse of files or applications, track the infiltration of malicious or unwanted files in a network, provide forensic information to aid intrusion or insider threat investigations, or even be used in combination with an anomaly detection system to identify availability or security problems.

File usage information collected on a computer system may become quite large so the host agent includes a component to filter out unimportant events. For example, network administrators could configure the system to only collect information about the launching of applications. Using such a configuration events about access to non-applications would be filtered by the host agents and not sent to the network service. The network service in turn receives and stores the file usage information from the end host software agents. The network service can be physically implemented as a cluster of servers located within a service provider or collocated inside the same network as the host agents (e.g., inside the same enterprise). This configuration ensures that network latency between the host agents and the network service is minimized.

Each file usage report from the host agents is treated as a separate event and is stored in a database maintained by the file usage component 16. The network service provides a query interface that enables operators and management and security applications to quickly access the data. The interface allows the querier to specify a broad range of filters including:

1. The time and date range over which the query should be conducted,
2. The computer systems involved in the query
3. The range or set of file summaries included in the query,
4. An expression indicating what file names should be included in the query,
5. The types of files that should be involved (e.g., executables, PowerPoint files),
6. The application or user that opened, accesses, or ran the file,
7. The network protocols involved in transferring the file,
8. And other metadata.

There are many ways in which file usage information can be used to significantly improvement the management and security of computer systems and networks. For example, file usage information can be used to manage computer systems and the deployment of software. File usage statistics can be used to track the applications run and the files accessed by different users or computers. This information can be used to see which users have or have not patched or upgraded specific applications or system software, started using new applications, stopped using obsolete applications, or used unapproved applications (e.g., P2P software). In addition, this information can be used to help support personnel to remotely diagnose problems and suggest solutions such as upgrading or installing certain software or configuration files.

File usage information can be used to help secure computing resources by providing information to analyze intrusions and assess the scope of an infection or malicious or unwanted files in a network. For example, if operators identify a new malicious program and want to see what hosts in their network are infected, they can query the file usage database in the network service. The service will provide information about all the systems and users that have run the malicious program or opened the malicious file. In addition, file usage events can be used to provide forensic information to aid intrusion or insider threat investigations. File usage information can be used to see what files particular users accessed on what dates at what times.

File usage information can also be used in combination with an anomaly detection system to detect potential availability or security problems. For example, if a large number of hosts suddenly start running a new application unknown to administrators it could indicate that new worm or spyware application is present in the network. An anomaly detection system can also identify suspicious patterns of application or file usage for different users or applications. Such information can be used to identify intruders or infected programs.

In one aspect of this disclosure, the system may be used to retrospectively detect unwanted files that have been accessed in the past. There can be a delay between the time when a malicious file or attack is present on the Internet or a network and when signatures or techniques are developed to detect that threat. When a new signature or other type of intelligence becomes available indicating a particular file, set of files, parts of a file, or signature of a file is suspicious or unwanted, the proposed method enables the use of file access history to identify all the users, hosts, and applications that may be previously access that suspicious file. Thus, while a file may have previously been thought to be innocuous, and access was permitted to that file, when a new signature or piece of intelligence becomes available indicating that file was actually malicious or unwanted, cached files and file access history can be analyzed to determine what users, hosts, applications accessed the suspicious file. The proposed method then provides files and file access context with each such event that can be used to identify users, hosts, applications, and files that may have been infected or impacted by the threat.

Retrospective detection only possible because another entity independent from the end host accessing the file, in one embodiment the network service stores a record of the file accessed. This record can be analyzed at the later time to determine which end hosts accessed unwanted or malicious files.

Retrospective detection is an especially important post-infection defense against 0-day threats and is independent of the architecture employed by the file analysis component. For example, if a polymorphic threat not detected by any antivirus or behavioral engine that infects a few hosts on a network, in the host-based antivirus paradigm, those hosts could become infected, have their antivirus software disabled, and continue to be infected indefinitely. However, using the proposed method, those hosts could be identified as potentially infected even after the attack happened and the malicious software deleted forensics information that could be used to identify it.

Figure 5:
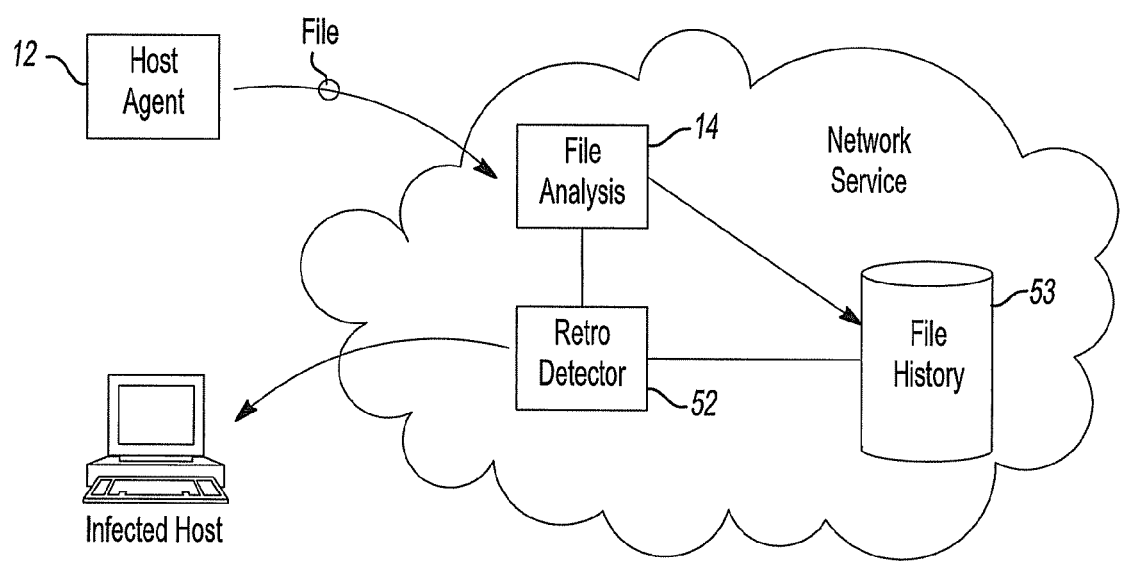
FIG. 5 is a diagram illustrating system components for performing retrospective detection The drawings described herein are for illustration purposes only and are not intended to limit the scope of the present disclosure in any way.

With reference to FIG. 5, the system for detecting, analyzing and quarantining unwanted files further includes a retrospective detector component 52 and a file history database 53. The file history database 53 is configured to store an entry for each file that is analyzed by the network service. Upon analyzing a file, the file analysis component 14 inserts an entry for the file into the file history database. In an exemplary embodiment, each entry includes a unique indicator for the file analyzed and an indicator for the computing device from which the file was received. File entries may include other attributes associated with the file. It is envisioned that the file history database and the file usage database may be one in the same or two separate data stores.

When the file analysis component subsequently detects an unwanted file, the unwanted file or an indication thereof is passed along to the retrospective detector. The retrospective detector 52 in turn searches the file history data database 53 for any previously analyzed files that match the unwanted file. If a match is found, the retrospective detector can notify system administrators, remove the unwanted file of an infected host device, quarantine the infected device or user, and/or take other corrective measures. The stored indicator for the computing device from which the file was received can be used to perform these measures. Alternatively or additionally, the retrospective detector 52 may access the file usage database to retrieve additional information regarding the file.

In one embodiment of the retrospective detection system, the end host is a mobile device such a mobile phone, PDA, e-book reader, laptop, or other mobile portable device. The device downloads, opens, runs, or otherwise accesses a file. The first time this file is accessed the file is deem safe and mobile devices is permitted to access it. However, later it found that file is unwanted. A retrospective detection system deployed in the network cloud by the service provider is then used identify information such as all devices that had accessed this file, when it was accessed, and who accessed it. Such information can be to inform mobile device owners, quarantine access to that file, or even automatically delete files, patch files, or clean the impacted devices.

The above description is merely exemplary in nature and is not intended to limit the present disclosure, application, or uses.

What is claimed is:

1. A system for detecting, analyzing and quarantining unwanted files in a computing environment, comprising:
    a computer processor;
    a file history data store that stores an indicia for each of a plurality of candidate files previously analyzed by the system;
    a detection engine that receives the plurality of candidate files for inspection, analyzes the plurality of candidate files to identify an unwanted candidate file, and logs indicia for each of the plurality of candidate files in the file history data store, wherein the detection engine sends an indicia for the unwanted candidate file to a retrospective detector and is embodied as computer executable instructions executed by the computer processor; and
    the retrospective detector is configured to receive the indicia for the unwanted candidate file analyzed by the detection engine and operates, in response to the indicia for the unwanted candidate file, to search the plurality of candidate files in the file history data store for candidate files that match the unwanted candidate file, the retrospective detector performs corrective action in relation to any candidate file in the plurality of candidate files that match the unwanted candidate file and is embodied as computer executed instructions executed by the computer processor.

2. The system of claim 1 further comprises a host agent embodied as computer executable instruction on a non-transitory computer readable medium and residing on a given computing device in the network environment, the host agent detects a new file introduced to the computing device and sends the new file to the network service for analysis while blocking access to the new file.

3. The system of claim 2 wherein the host agent resides on a mobile device.

4. The system of claim 2 wherein the host agent receives an aggregate report from the network service regarding the new file and regulates access to the new file based on results in the aggregate report.

5. The system of claim 4 wherein the host agent stores the aggregate report in cache and, upon receipt of a second new file, accesses the aggregate report in the cache before sending the second new file to the network service.

6. The system of claim 4 wherein the network service stores the aggregate report in cache and, upon receipt of a second new file, the request dispatcher accesses the aggregate report in the cache before distributing the second new file.

7. The system of claim 2 wherein the host agent collects host context data indicative of operating state and configurations of the given computing device and send the host context data along with the new file to the network service.

8. The system of claim 7 wherein the network service replicates operating state of the given computing device using the host context data and simulates access of the new file.

9. The system of claim 2 wherein the host agent captures a virtual machine image of the given computing device and sends the virtual machine image along with the new file to the network service.

10. The system of claim 1 wherein the network service instantiates more than that one instance of a particular type of detection engine.

11. The system of claim 1 wherein the retrospective detector generates a report of the candidate files in the plurality of candidate files that match the unwanted candidate file.

12. The system of claim 1 wherein the retrospective detector removes the candidate files in the plurality of candidate files that match the unwanted candidate file from the computing environment.

13. The system of claim 1 wherein the detection engine generates a signature for each of the plurality of candidate files using cryptographic techniques and stores the signature as the indicia for each candidate file in the file history data store.

14. The system of claim 1 wherein the indicia for the unwanted candidate file is one of a subset of bytes in the unwanted candidate file, a permutation of bytes in the unwanted candidate file, a hash of the unwanted candidate file or the unwanted candidate file itself.

15. The system of claim 1 wherein the retrospective detector receives the indicia of the unwanted candidate file from the detection engine or another external source.

16. The system of claim 1 is embodied as a network service in a network environment that is accessible to a plurality of computing devices.

17. A system for detecting, analyzing and quarantining unwanted files in a network environment, comprising:
   a computer processor;
   a network service accessible to computing devices in the network environment and embodied as computer executable instructions executed by the computer processor, wherein the network service includes:
      a request dispatcher configured to receive a given candidate file for inspection from a given computing device in the network environment and distribute the given candidate file to each one or more of a plurality of detection engines,
      the plurality of detection engines operating in parallel with each other to analyze the given candidate file and output a report regarding the given candidate file, where each of the plurality of detection engines analyzes the given candidate file using a different detection algorithm and logs an indicia for the given candidate file in a file history data store;
      a result aggregator configured to receive reports from one or more of the detection engines regarding the given candidate file and aggregates the reports in accordance with an aggregation algorithm;
      the file history data store that stores an indicia for each of a plurality of candidate files analyzed by the network service along with an indicia of the computing device from which each of the candidate files were received; and
   a retrospective detector associated with the network service and configured, upon detection of an unwanted candidate file deemed unwanted by the network service, to search the plurality of candidate files for any files that match the unwanted candidate file and perform corrective actions in relation to any files that match the unwanted candidate file.

18. The system of claim 17 further comprises a host agent embodied as computer executable instructions on a non-transitory computer readable medium and residing on the given computing device in the network environment, the host agent detects the given candidate file introduced to the given computing device and sends the given candidate file to the network service for analysis.

19. The system of claim 17 wherein the retrospective detector generates a report of candidate files previously analyzed by the network service that match the unwanted candidate file.

20. The system of claim 17 wherein the retrospective detector removes the candidate files that match the unwanted candidate file from the computing device hosting the unwanted candidate file.

21. The system of claim 17 wherein the network service generates a signature for each of the plurality of candidate files using cryptographic techniques and stores the signature as the indicia for each candidate file in the file history data store.

22. The system of claim 17 wherein the indicia for the given candidate file is one of a subset of bytes in the given candidate file, a permutation of bytes in the given candidate file, a hash of the given candidate file or the given candidate file itself.

* * * * *